(12) United States Patent
Bouzguarrou et al.

(10) Patent No.: US 11,226,824 B2
(45) Date of Patent: Jan. 18, 2022

(54) CIRCUITRY AND METHOD

(71) Applicant: Arm Limited, Cambridge (GB)

(72) Inventors: Houdhaifa Bouzguarrou, Valbonne (FR); Vincenzo Consales, Paca (FR)

(73) Assignee: Arm Limited, Cambridge (GB)

( * ) Notice: Subject to any disclaimer, the term of this patent is extended or adjusted under 35 U.S.C. 154(b) by 13 days.

(21) Appl. No.: 16/656,877

(22) Filed: Oct. 18, 2019

(65) Prior Publication Data
US 2020/0133674 A1    Apr. 30, 2020

(30) Foreign Application Priority Data

Oct. 30, 2018 (GB) .................................... 1817688

(51) Int. Cl.
| | |
|---|---|
| *G06F 9/38* | (2018.01) |
| *G06F 21/75* | (2013.01) |
| *G06F 9/30* | (2018.01) |
| *G06F 3/06* | (2006.01) |

(52) U.S. Cl.
CPC .......... *G06F 9/3806* (2013.01); *G06F 3/0629* (2013.01); *G06F 9/30058* (2013.01); *G06F 21/75* (2013.01); *G06F 2207/7219* (2013.01)

(58) Field of Classification Search
CPC .... G06F 9/3806; G06F 21/75; G06F 9/30058; G06F 3/0629; G06F 2207/7219; G06F 9/3844; G06F 21/556
See application file for complete search history.

(56) References Cited

U.S. PATENT DOCUMENTS

| | | | | |
|---|---|---|---|---|
| 4,763,245 A | * | 8/1988 | Emma ................... | G06F 9/3848 712/240 |
| 5,574,871 A | * | 11/1996 | Hoyt ..................... | G06F 9/3806 712/200 |
| 2008/0052499 A1 | | 2/2008 | Koc | |
| 2009/0089564 A1 | * | 4/2009 | Brickell ................ | G06F 9/3846 712/239 |
| 2009/0113217 A1 | * | 4/2009 | Dolgunov ............. | H04L 9/0894 713/190 |
| 2011/0320792 A1 | * | 12/2011 | Bonanno ............... | G06F 9/3806 712/240 |

(Continued)

OTHER PUBLICATIONS

Combined Search and Examination Report for GB1817688.3 dated Apr. 30, 2019, 8 pages.

(Continued)

*Primary Examiner* — Farley Abad
(74) *Attorney, Agent, or Firm* — Nixon & Vanderhye P.C.

(57) ABSTRACT

Circuitry comprises a prediction register storing a plurality of entries each having respective data values for association with one or more branch instructions; prediction circuitry to detect, using prediction data derived by a mapping function from the stored data values associated with a given branch instruction, whether or not a branch represented by the given branch instruction is predicted to be taken; update circuitry to modify the stored data values associated with the given branch instruction in dependence upon a resolution of whether the branch represented by the given branch instruction is taken or not; and control circuitry configured to selectively alter one or more of the data values other than data values associated with the given branch instruction.

9 Claims, 7 Drawing Sheets

(56) References Cited

U.S. PATENT DOCUMENTS

2016/0170889 A1 6/2016 Lee et al.
2019/0138315 A1 5/2019 Bolbenes et al.

OTHER PUBLICATIONS

Evtyushkin et al., "BranchScope: A New Side-Channel Attack on Directional Branch Predictor", ASPLOS' 18, Mar. 24-28, 2018, pp. 693-707.
Wikipedia entry, "Branch Predictor", last edited Sep. 10, 2018, 10 pages.
Examination Report for GB Application No. 1817688.3 dated Feb. 10, 2021, 3 pages.

\* cited by examiner

CIRCUITRY AND METHOD

This application claims priority to GB Patent Application No. 1817688.3 filed Oct. 30, 2018, the entire contents of which are hereby incorporated by reference.

BACKGROUND

This disclosure relates to circuitry and methods.

In some data processing applications, so-called branch prediction is used to predict instances of non-linear program flow, such as the outcome (branch taken or branch not taken) from conditional program flow branching instructions.

In some examples, the branch prediction process runs ahead of the execution of the instructions to provide the instructions speculatively in time to avoid so-called starvation (which would occur if insufficient instructions (that were next to be executed) were fetched in time for execution.

In order to predict the presence of a branch into a given program code portion, a historical data store such as a so-called branch target buffer (BTB) can provide an indication of previously taken branches at particular program counter (PC) values. For example, an attribute of the data item representing the previously taken branch, such as the PC value or part of it, can be used as the basis of a mapping between the data item and a storage location in the BTB.

SUMMARY

In an example arrangement there is provided circuitry comprising:

a prediction register storing a plurality of entries each having respective data values for association with one or more branch instructions;

prediction circuitry to detect, using prediction data derived by a mapping function from the stored data values associated with a given branch instruction, whether or not a branch represented by the given branch instruction is predicted to be taken;

update circuitry to modify the stored data values associated with the given branch instruction in dependence upon a resolution of whether the branch represented by the given branch instruction is taken or not; and control circuitry configured to selectively alter one or more of the data values other than data values associated with the given branch instruction.

In another example arrangement there is provided circuitry comprising:

a prediction register having a plurality of entries each storing prediction data;

mapping circuitry to map branch instructions to respective entries of the prediction register;

detection circuitry to detect, from the stored prediction data of the prediction register entry mapped to a given branch instruction, whether or not a branch represented by the given branch instruction is predicted to be taken; and update circuitry to modify the stored prediction data of the prediction register entry mapped to a given branch instruction in dependence upon a resolution of whether the branch represented by the given branch instruction is taken or not, the update circuitry comprising control circuitry to inhibit updating of one or more selected prediction register entries in response to control data specifying the one or more selected prediction register entries.

In another example arrangement there is provided a method comprising:

storing a plurality of entries each having respective data values for association with one or more branch instructions;

detecting, using prediction data derived by a mapping function from the stored data values associated with a given branch instruction, whether or not a branch represented by the given branch instruction is predicted to be taken;

modifying the stored data values associated with the given branch instruction in dependence upon a resolution of whether the branch represented by the given branch instruction is taken or not; and selectively altering one or more of the data values other than data values associated with the given branch instruction.

In another example arrangement there is provided a method comprising:

storing a plurality of entries each providing prediction data;

mapping branch instructions to respective entries of the prediction register;

detecting, from the stored prediction data of the prediction register entry mapped to a given branch instruction, whether or not a branch represented by the given branch instruction is predicted to be taken;

updating the stored prediction data of the prediction register entry mapped to a given branch instruction in dependence upon a resolution of whether the branch represented by the given branch instruction is taken or not; and inhibiting the updating step from updating one or more selected prediction register entries in response to control data specifying the one or more selected prediction register entries.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF THE EMBODIMENTS

Figure 1:
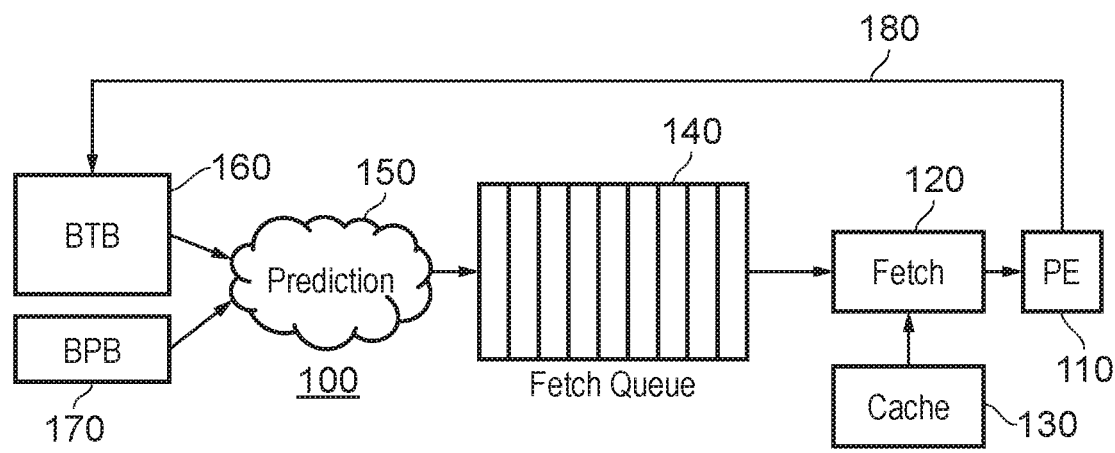
FIG. 1 schematically illustrates an example of data processing circuitry.

FIG. 1 is a schematic example of data processing circuitry 100 comprising a processing element (PE) 110 to execute program code instructions, fetch circuitry 120 to fetch blocks, containing instruction for execution, from memory and/or a cache 130 such as an instruction cache. The blocks to be fetched are defined by a fetch queue 140. The data processing circuitry also comprises prediction circuitry 150 to predict one or more next blocks to be fetched and to add the predicted next blocks to the fetch queue 140.

The prediction circuitry 150 makes reference to branch target storage including at least a branch target buffer (BTB)

160 and to a branch prediction buffer (BPB) 170. These are drawn separately for clarity of the diagram but may be considered part of the prediction circuitry 150. The BTB 160 provides information which associates program counter (PC) values of an instruction to be executed with an associated branch target in the case that the instruction is a branch instruction. The BPB 170 stores historical data about the outcome (branch taken or branch not taken) of previous instances of the branch instructions, the historical data allowing the prediction circuitry 150 to arrive at a prediction of whether a particular branch instruction indicated by the BTB 160 will be taken or not taken.

Various mechanisms may be used by the prediction circuitry 150 to predict the "taken" or "not taken" status for an expected branch instruction. An example of such a technique is provided in U.S. Ser. No. 15/806,605 and https://en.wikipedia.org/wiki/Branch_predictor, the contents of each of which are hereby incorporated by reference. The prediction circuitry 150 uses such a technique to predict blocks (or portions, or granules, or even in an extreme example individual instructions) of program code to be fetched and adds data identifying such blocks to the fetch queue 140, on a first-in, first-out basis. The fetch circuitry 120 retrieves such data from the fetch queue 140 on the same basis (which is to say, the fetch circuitry 120 retrieves the least-recently-added entry or entries in the fetch queue 140) and initiates fetching of the blocks indicated by those entries. The required blocks may be in the cache 130 or may need to be retrieved from a main memory or higher level cache (not shown in FIG. 1).

In due course, the processing element 110 executes the fetched blocks of program code. Generally speaking, the system aims to fetch program code in advance of its execution, so that processing is not itself held up by a lack of code to be executed. So in this regard the fetching is speculative and is based purely on predictions made by the prediction circuitry. The predictions of branch outcomes will be proved to be either correct or incorrect when the relevant branch instruction is finally executed or resolved. If a prediction is incorrect, it may be that the wrong branch target code has been fetched (or code at a branch target has been fetched but the branch, when resolved, was not in fact taken) and the fetch and execution pipelines have to be flushed, incurring a delay while the correct blocks of program code are fetched for execution.

The processing element can provide information 180 back to the BTB 160 and BPB 170 relating to branch instructions actually encountered during execution, as well as their actual outcome. Where a branch instruction is encountered during execution (at least for a branch instruction where the branch is actually taken, though possibly for all branch instructions), information can be stored in the BTB 160 relating to the target of that branch instruction. Information relating to the outcome of the branch instruction (taken/not taken) can also be stored in the BPB 170.

FIG. 1 therefore provides an example of a data processor 100 having a processing element 110 to execute data processing instructions; fetch circuitry 120 to fetch instructions for execution, defined by entries in a fetch queue 140; and prediction circuitry 150, 160, 170 to generate entries for the fetch queue defining one or more next data processing instructions to be fetched; the prediction circuitry comprising circuitry as defined below, in which in at least some examples the circuitry provides branch target storage to store one or more data items each comprising at least part of a program counter value and information defining a respective branch target address for a previously taken branch instruction, in which the attribute of a data item is dependent at least upon the program counter value.

Figure 2:
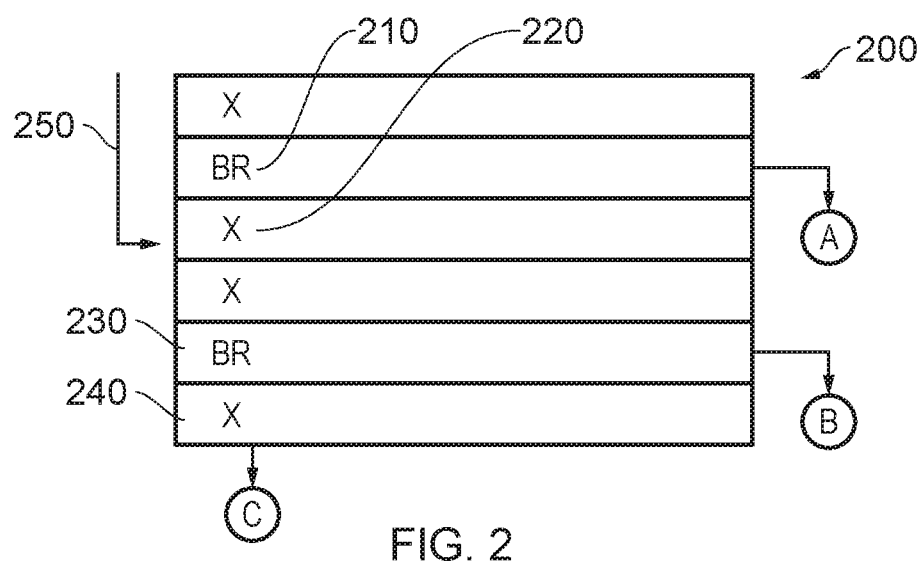
FIG. 2 schematically illustrates a series of data processing instructions.

FIG. 2 schematically illustrates a series of data processing instructions forming an example of a program code block, portion or granule 200. In the schematic representation of FIG. 2, six instructions are illustrated, but in example embodiments of the present disclosure the blocks of instructions may have a consistent base length (in bytes), being for example a power of two or at least a multiple of two, and are address-aligned in memory to positions representing multiples of the base length. For example, each portion may have a base length of 16 bytes and the portions may be aligned to 16 byte boundaries in memory.

In FIG. 2, the successive instructions are indicated as either "X" or "BR". The "X" instructions are non-branching instructions and are represented in this schematic manner to indicate that it is irrelevant to the present discussion what type of instruction they are. The "BR" instructions are conditionally branching instructions which can lead to a non-linear change in program flow depending on one or more parameters on the basis of which branch decision is taken.

Referring to a first example branch instruction 210, if the branch represented by this instruction is taken, then program flow is diverted to another program counter value A. If not, program flow continues to the next sequential instruction 220. Similarly, if the branch at a branch instruction 230 is taken, program flow is diverted to a program counter value B, but if not, flow continues to the next sequential instruction 240. Therefore, as a result of execution of the portion 200, program flow can:

redirect to the program counter value A;
redirect to the program counter value B; or
continue to the next-in-order program counter value C (in a next granule, not shown).

Note that branch targets or destinations do not have to be aligned with the beginning of a portion such as the portion 200. In fact, a branch from elsewhere may enter the portion 200 at any instruction position, for example at the instruction 220 for an incoming branch 250.

Figure 3:
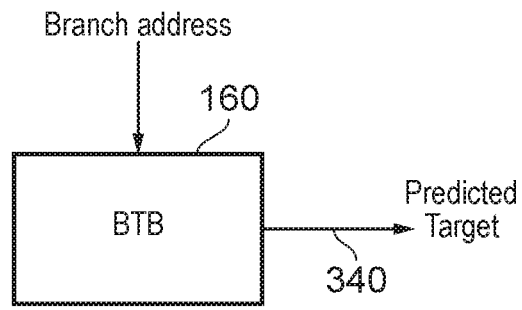
FIGS. 3 and 4 schematically illustrate prediction circuitry.
Figure 4:
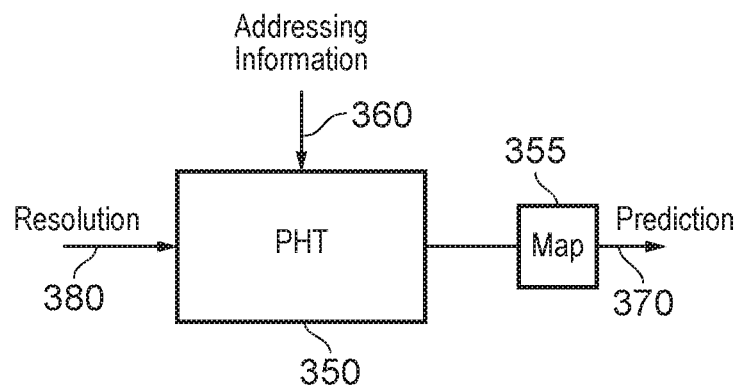

FIGS. 3 and 4 schematically illustrate an example of the operation of the prediction circuitry 150 including the functionality of the BTB 160 and the BPB 170.

Regarding the BTB 160, this receives a branch address 300 or program counter (PC) value, for example being the next PC value in the sequence described with reference to FIG. 2. The branch address (or a hash of the branch address or one or more parts of the branch address) is mapped by the BTB or circuitry associated with or forming part of the BTB to a predicted branch target address 340.

The BTB 160 will output the predicted branch target address 340 in any instance where there is an appropriate entry within the BTB 160, which is to say that the outputting of the predicted branch target address 340 by the BTB 160 is, in at least this example, independent of a prediction (to be discussed below) of whether the relevant branch will actually be taken.

Regarding the prediction of whether the branch is actually taken, various techniques are available such as one shown by way of example in FIG. 4 which involves the use of a so-called pattern history table (PHT) 350, forming at least a part of the BPB 170 mentioned above.

The PHT 350 provides a so-called adaptive branch prediction in which the recent history of whether a branch was taken or not taken is used to select a respective version of prediction information stored by the PHT 350 for the current branch instruction.

For example, to provide a prediction, a two-bit saturating counter may be used, representing a state machine with four states:

| | |
|---|---|
| 00 | Strongly not taken |
| 01 | Not taken |
| 10 | Taken |
| 11 | Strongly taken |

Here, the term "strongly" simply indicates that with the saturating counter scheme, it will take two successive instances of that prediction being incorrect in order to change the prediction represented by the saturating counter (so, to move from 00, strongly not taken, to 10, taken, requires two successive increments of the saturating counter before the actual prediction represented by the state of the saturating counter changes from a prediction of "not taken" to a prediction of "taken".

The saturating counter is updated in response to the actual resolution of a branch instruction. If the resolution of a relevant branch instruction is "taken" then the saturating counter is incremented, subject to saturation at the value 11. If the resolution of the relevant branch instruction is "not taken" then the saturating counter is decremented, subject to saturation at the value 00.

In terms of its adaptive operation, the PHT 350 stores (and selects from, for a given branch instruction) a plurality of entries each representing, for example, a two-bit saturating counter of the type described above. The PHT 350 accesses a relevant entry according to addressing information 360 to be discussed below and provides that counter value to mapping circuitry 355 which applies the mapping given in the table above to output a prediction 370 of "taken" (for a counter value of 10 or 11) or "not taken" (for a counter value of 00 or 01) depending on the contents of the addressed PHT entry.

When the resolution of that branch instruction is determined, the resolution is communicated 380 to the PHT 350 (as shown schematically as the information 180 in FIG. 1) and the relevant saturating counter is addressed once again and updated by an increment or a decrement depending on whether or not the branch was taken. In this way, the prediction circuitry is configured to modify the stored prediction data in dependence upon a resolution of whether the branch represented by the given branch instruction (relevance to the stored entry) is taken or not.

As mentioned above, the PHT 350 provides a plurality of entries and an individual entry is selected according to the addressing information 360.

Figure 5:
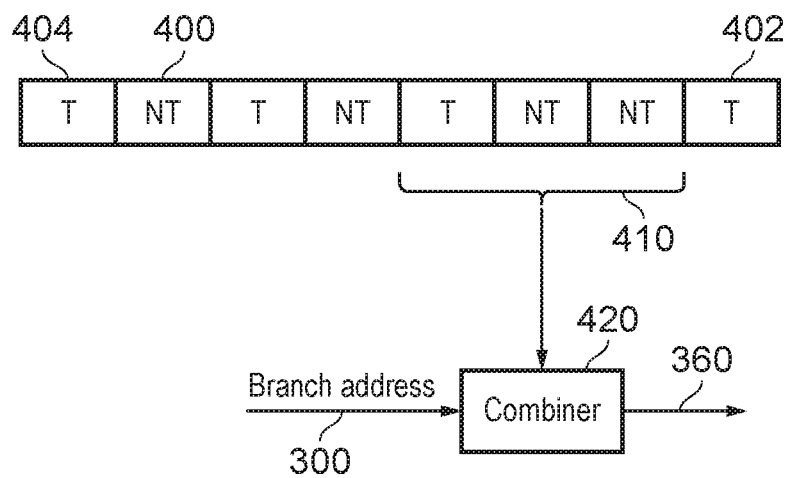
FIG. 5 schematically illustrates addressing information generation.

Various possibilities are available for generating the addressing information 360. In an example shown schematically in FIG. 5, a history register 400 maintains a history of recent outcomes of branch instruction execution, from a most recent outcome 402 to a least recent (in the terms of the size of the history register 400) outcome 404. As a branch instruction is resolved, it outcome is inserted at the most recent outcome position 402 and the other contents of the history register are shuffled towards the least recent outcome position 404. In practical terms, this may be achieved using a circular buffer and moving pointers, but the effect is as described above. In FIG. 5, the historical outcomes are shown as T (taken) or NT (not taken) but these may be stored as respective bit values such as 1, 0.

The history register 400 can be a global history register such that the outcomes stored in the history register 400 relate to all executed branch instructions, or could be a local history register such that the stored branch outcomes related to outcomes of a branch instruction at a particular branch address (PC value). In the current example, the history register 400 is a global history register. A subset 410 of bits of the history register 400, for example at a predetermined position relative to the most recent 402 and the least recent 404 positions in the history register, can be used as an input in the generation of the addressing information 360.

Therefore, in these examples of a local history register, each prediction register entry comprises a plurality of prediction data values, and the prediction circuitry is configured to select one of the prediction data values for use as the prediction data for a given branch instruction according to a permutation of most recent resolutions of whether the branch represented by the given branch instruction is taken or not.

Another possible contribution to the addressing information 360 is the branch address 300, or at least a subset of its bits. One or both of these inputs may be combined by a combiner 420 to generate the addressing information 360. For example, the combiner could include a logical exclusive-or (XOR) function. In other examples, the combiner 420 may include a hashing function.

A hashing function is, in this context, a generic function which maps a data input to a data output. In the context of accessing entries in the PHT, a desirable feature of a suitable hashing function is that relatively similar branch addresses are mapped to relatively disparate entries or locations within the PHT.

Figure 6:
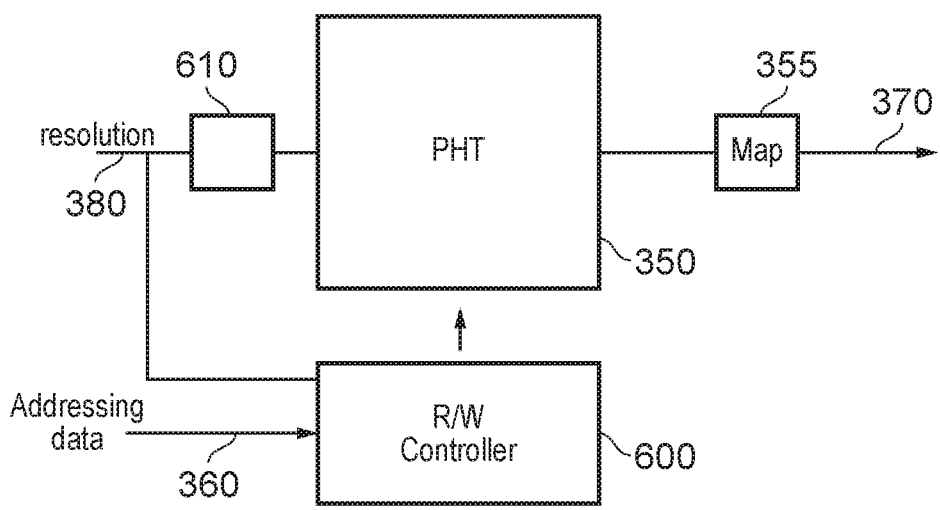
FIG. 6 schematically illustrates the operation of a pattern history table.
Figure 7:
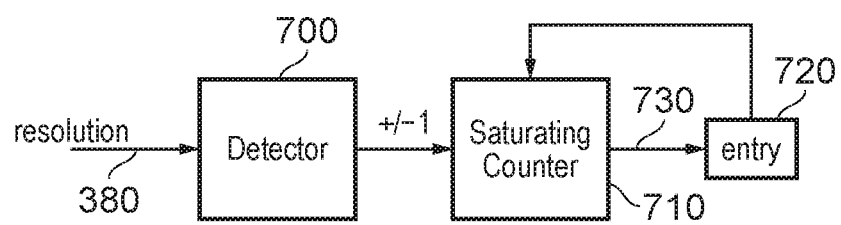
FIG. 7 schematically illustrate an update operation.

FIGS. 6 and 7 concern the operation of the PHT 350 in response to the addressing data 360. A read/write (R/W) controller 600 selects a single entry in the PHT 350, the output of which is mapped by the mapping circuitry 355 to generate the prediction 370. In terms of updating entries in the PHT 350, when a resolution 380 of the branch instruction is received, the addressing data 360 is recreated so as to access the same PHT entry which is then updated according to the resolution 380 by updating circuitry 610 shown in more detail in FIG. 7.

Referring to FIG. 7, the resolution 380 is provided to a detector 700 which detects whether to increment or decrement the saturating counter associated with the current PHT entry according to the rules discussed above (for example, an increment in the case of a taken branch and a decrement in the case of a not-taken branch). A saturating counter 710 is responsive to the current PHT entry 720 to add or subtract one subject to the saturation values of 00 and 11. The output 730 of the saturating counter is written back to the entry 720 under the control of the R/W controller 600.

Therefore, in the examples given above, there has been described circuitry comprising a prediction register such as the PHT 350 storing a plurality of entries each having respective data values for association with one or more branch instructions, prediction circuitry 355, 600 to detect, using prediction data derived by a mapping function from the stored data values associated with a given branch instruction, whether or not a branch represented by the given branch instruction is predicted to be taken, and update circuitry 610, 600 to modify the stored data values associated with the given branch instruction in dependence upon a resolution of whether the branch represented by the given branch instruction is taken or not.

Various examples will be discussed below relating to the use of control circuitry configured to selectively alter one or more of the data values (in the prediction register or PHT) other than data values associated with (for example being a prediction register entry and/or a data value in that entry selected by the prediction circuitry for use with) the given branch instruction.

Such techniques can lead to deliberately imposed uncertainty in the contents of the PHT 350. Such uncertainty can potentially help to alleviate the effect of a so-called BranchScope attack on the operation of data processing apparatus. The BranchScope attack is discussed in the paper "BranchScope: A New Side-Channel Attack on Directional Branch Predictor", Evtyushkin et al, ASPLOS'18, Mar. 24-28, 2018, Williamsburg, Va., USA, and attempts to use a branch direction predictor such as the PHT 350 to leak information between secure "victim" program code and malicious "attacker" program code, by detecting, directly or indirectly, the contents of the PHT 350 and the effect of successive variations of those contents. If PHT entries other than the entry relating to the branch under consideration are altered, this can potentially mask or remove any correlation or other effects which the BranchScope attack may attempt to exploit in order to detect secure information from the victim program code. So, in examples, the control circuitry is configured to modify the stored data values of a set of one or more prediction register entries other than an entry associated with the given branch instruction under consideration.

Figure 8:
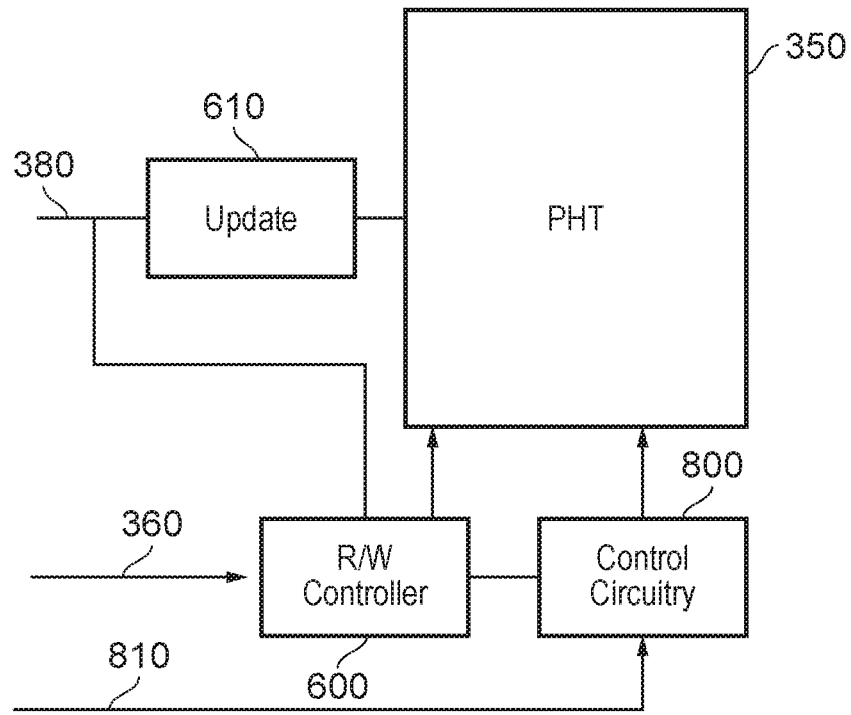
FIGS. 8-12 schematically illustrate respective circuitries.

Referring to FIG. 8, an example is shown in which the set of one or more prediction register entries (other than the entry relevant to the current branch instruction) comprises a predetermined set of prediction register entries.

In FIG. 8, control circuitry 800 interacts with the R/W controller 600 to select a set of one or more other predetermined PHT entries in the PHT 350 as well as the entry relating to the branch instruction for which the resolution 380 has been received, so that the update circuitry 610 applies an update corresponding to the received resolution 380 to those additional entries as well as to the entry relating to the current branch instruction. The control circuitry 800 can perform this additional modification in response to a control signal 810, for example an enable signal such that the control circuitry 800 does not control the modification or alteration of any additional data values unless it is enabled to do so by the enable signal 810.

Figure 9:
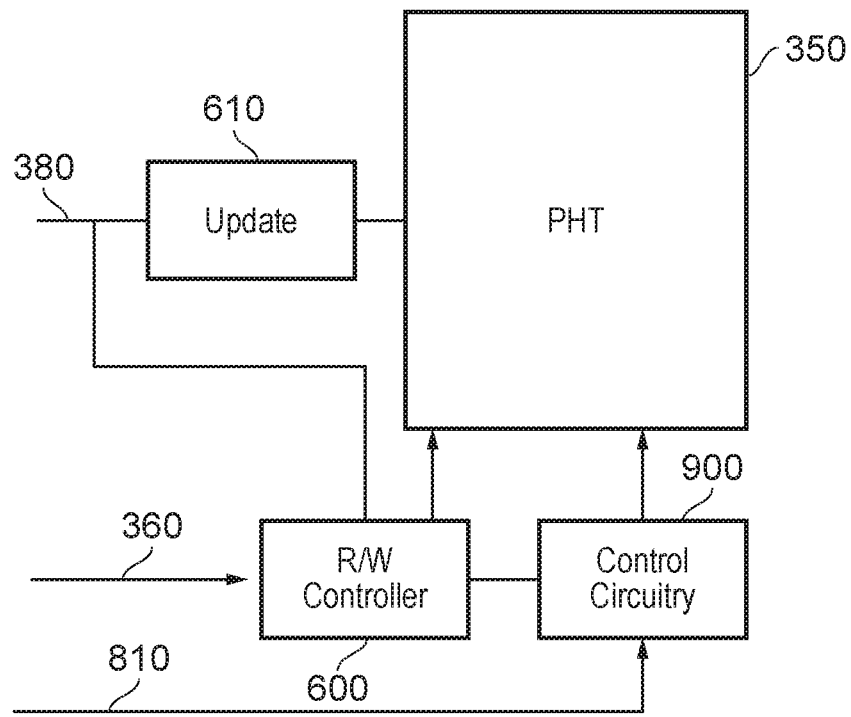

A similar arrangement is shown in FIG. 9, except that control circuitry 900 (again operating under the control of an enable signal 810) selects a set of one or more other prediction register entries to be updated (according to the resolution 380) as locations at predetermined offsets or relative positions with respect to the PHT entry selected by the R/W controller 600.

Figure 10:
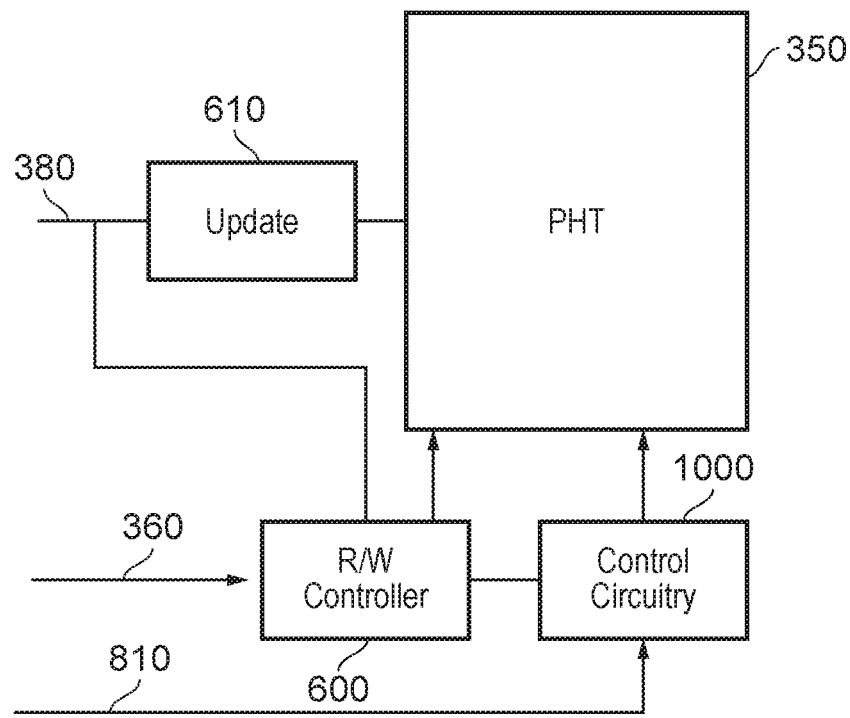

A similar arrangement is again shown in FIG. 10, except that control circuitry 1000 (again operating under the control of an enable signal 810) selects a set of one or more other prediction register entries to be updated (according to the resolution 380) on a random or pseudorandom basis. In this way, one or both of (i) the number of additional prediction register entries, and (ii) the locations within the PHT 350 of the additional prediction register entries can be chosen randomly or pseudorandomly.

Figure 11:
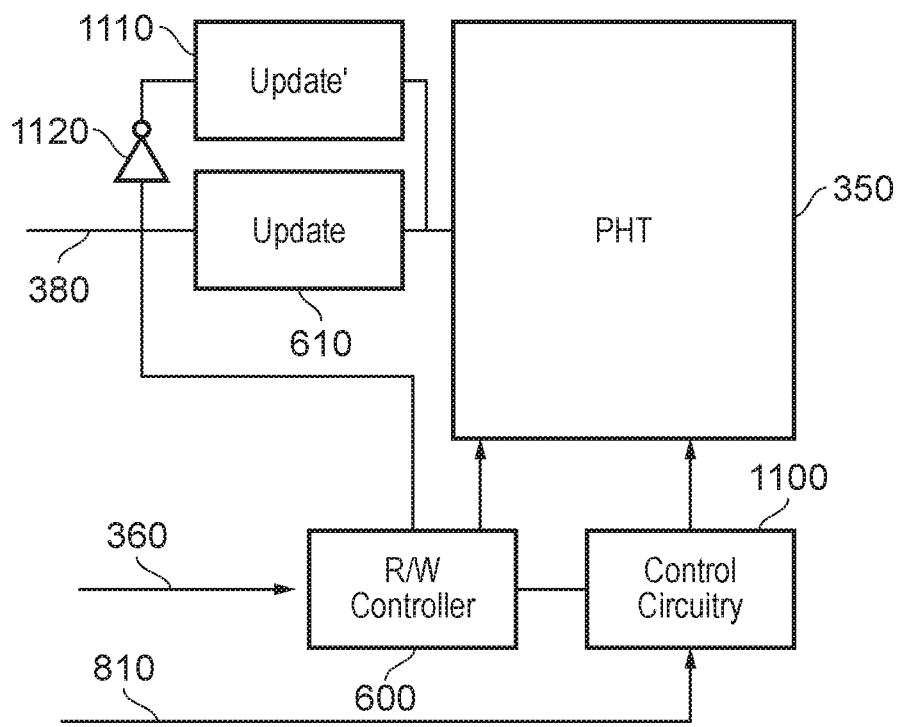

In FIG. 11, different potential updates are applied to the PHT 350 entry responding to the current branch instruction and to the one or more other entries. To achieve this, for schematic illustration, further update circuitry 1110 is provided and a schematic NOT operation 1120 is shown to represent the negation of the resolution 380 as supplied to the further update circuitry. So, if the resolution 380 is "taken" then the update applied by the further update circuitry 1110 corresponds to a situation of "not taken".

The control circuitry in FIG. 11 can select entries for additional updating according to any of the techniques shown with regards to FIGS. 8-10 and, indeed, can enable or disable the updating operation of the further update circuitry 1110 on a fixed, time-varying, pseudorandom or other basis so that the one or more other entries are either updated according to the resolution 380 or according to the opposite resolution. This provides an example in which, in response to the update circuitry 610 modifying the stored data values associated with the given branch instruction according to a first modification in dependence upon a resolution 380 of whether the branch represented by the given branch instruction is taken or not, the control circuitry 1100 is configured to apply (using the further update circuitry 1110) a second modification different to the first modification to a least one of the set of prediction register entries. For example, the modifications may be selected from candidate modifications of opposite polarities (taken—not taken; or increment—decrement) and the second modification applied by the further update circuitry 1110 may have the opposite polarity to the update applied by the update circuitry 610.

All of these examples of FIGS. 8-11 have the control circuitry operating in response to the enable signal 810. The enable signal may be, for example, an indicator associated with the given branch instruction, for example representing one bit of the instruction op-code or representing a part of the instruction operand. In other examples, the enable signal 810 can be derived from the contents of a processor register which can be set or unset under program control.

Figure 12:
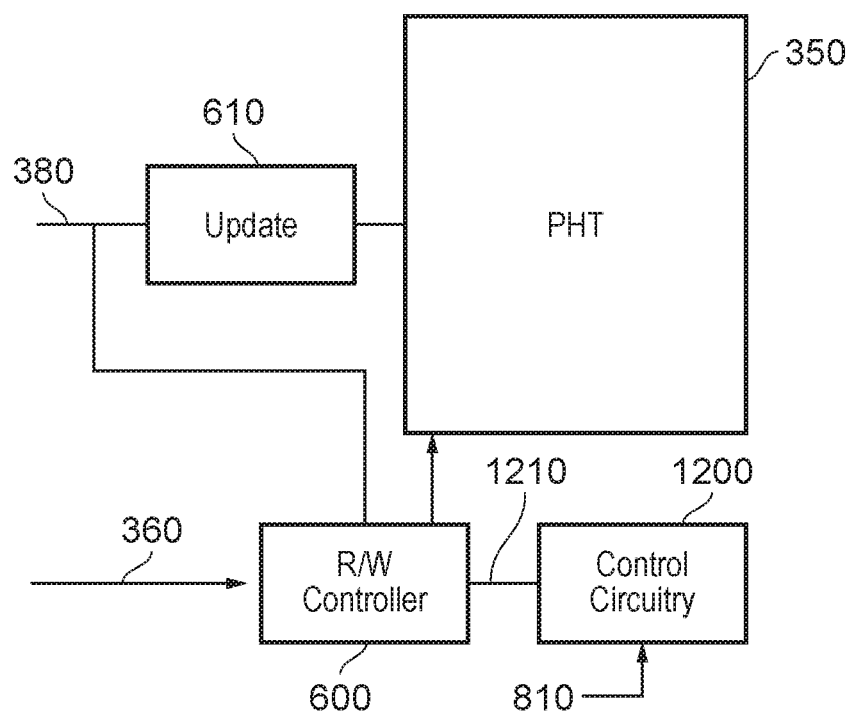

A further example is shown schematically in FIG. 12. In FIG. 12, as described above, the R/W controller 600 acts as mapping circuitry to map branch instructions to respective entries of the prediction register 350. Here, instead of (or indeed in addition to) the techniques described above in which further PHT entries are modified in addition to the one concerned with the current branch instruction, control circuitry 1200 can operate under the control of a signal 810 to inhibit the updating of one or more selected prediction register entries in response to control data 810 specify the one or more selected prediction register entries. In order to achieve this function, the control circuitry 1200 can at least partially control the R/W controller 600 so as to selectively inhibit its operation to update and entry by means of a control signal 1210.

The control circuitry 1200 can operate in an example mode so as to inhibit the updating of whichever entry is currently selected by the R/W controller 600 in response to a simple "enable" signal 810 (which could operate such that "enable asserted" implies "do update" or such that "enable asserted" implies "inhibit update").

In other example modes of operation, the control circuitry 1200 may be provided (for example by the control signal 810 (for example in response to execution of program instructions by the processing element 110 and/or reference to a stored list of branch instructions) with a schedule of PHT entries 354 which updating is to be inhibited, and controls the R/W controller 600 not to allow the updating of those entries by means of the control signal 1210.

Accordingly, the control signal 810 can specify the entries not be updated by, for example, a list or schedule or by, for example, a simple indication of "do not update the current PHT entry".

A potential cost associated with any of the embodiments discussed above is a possible reduction in accuracy of the branch prediction mechanisms, either because some branch prediction data is deliberately altered or because some branch prediction data is deliberately not updated. However, all of these techniques can serve to help alleviate the effects of attack such as a so-called BranchScope attack.

Figure 13:
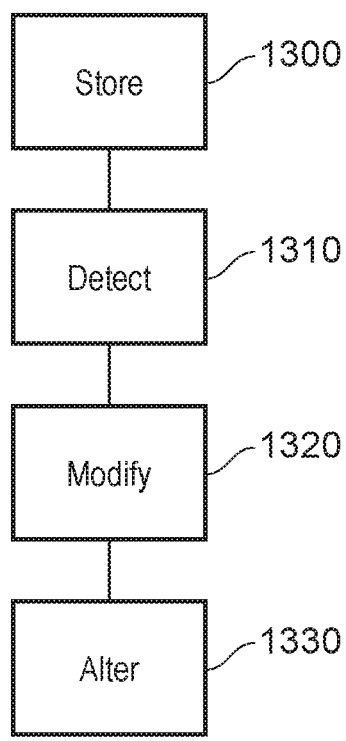
FIGS. 13 and 14 at schematic flowchart illustrating respective methods.

FIG. 13 is a schematic flowchart illustrating a method comprising:

storing (at a step 1300) a plurality of entries each having respective data values for association with one or more branch instructions;

detecting (at a step 1310), using prediction data derived by a mapping function from the stored data values associated with a given branch instruction, whether or not a branch represented by the given branch instruction is predicted to be taken;

modifying (at a step 1320) the stored data values associated with the given branch instruction in dependence upon a resolution of whether the branch represented by the given branch instruction is taken or not; and selectively altering (at a step 1330) one or more of the data values other than data values associated with the given branch instruction.

Figure 14:
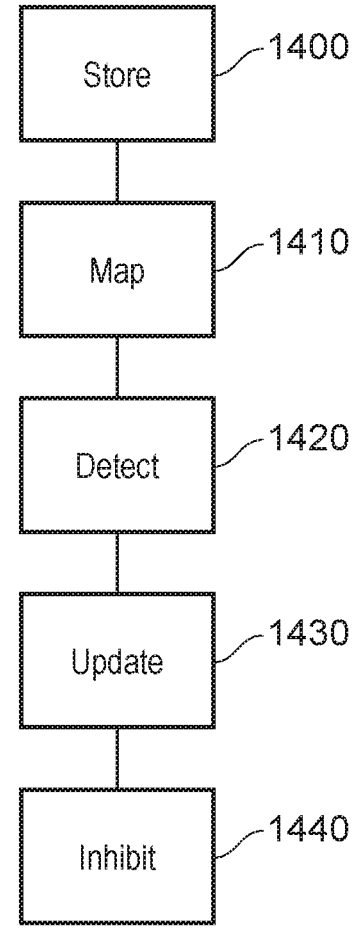

FIG. 14 is a schematic flowchart illustrating a method comprising:

storing (at a step 1400) a plurality of entries each providing prediction data;

mapping (at a step 1410) branch instructions to respective entries of the prediction register;

detecting (at a step 1420), from the stored prediction data of the prediction register entry mapped to a given branch instruction, whether or not a branch represented by the given branch instruction is predicted to be taken;

updating (at a step 1430) the stored prediction data of the prediction register entry mapped to a given branch instruction in dependence upon a resolution of whether the branch represented by the given branch instruction is taken or not; and inhibiting (at a step 1440) the updating step from updating one or more selected prediction register entries in response to control data specifying the one or more selected prediction register entries.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Circuitry comprising:
a prediction register storing a plurality of entries each having respective data values for association with one or more branch instructions;
prediction circuitry to detect, using prediction data derived by a mapping function from the stored data value associated with a given branch instruction that is obtained from the prediction register, whether or not a branch represented by the given branch instruction is predicted to be taken;
update circuitry to modify the data value associated with the given branch instruction as stored in an entry of the prediction register in dependence upon a resolution of whether the branch represented by the given branch instruction is taken or not; and
control circuitry configured, responsive to the modification by the update circuitry, to selectively modify the stored data values of a set of one or more additional entries of the prediction register other than the entry storing the data value associated with the given branch instruction.

2. The circuitry of claim 1, in which the set of one or more prediction register entries comprises a predetermined set of prediction register entries.

3. The circuitry of claim 1, in which the set of one or more prediction register entries comprises a random or pseudo-random set of prediction register entries.

4. The circuitry of claim 1, in which, in response to the update circuitry modifying the stored data values associated with the given branch instruction according to a first modification in dependence upon a resolution of whether the branch represented by the given branch instruction is taken or not, the control circuitry is configured to apply a second modification different to the first modification to at least one of the set of prediction register entries.

5. The circuitry of claim 4, in which:
the first modification is selected from candidate modifications of opposite polarities, each dependent upon whether the given branch instruction is resolved as a taken branch instruction or an untaken branch instruction; and
the second modification has the opposite polarity to the first modification.

6. The circuitry of claim 1, in which the control circuitry is configured to operate in response to an indicator associated with the given branch instruction.

7. The circuitry of claim 1, in which:
the prediction register comprises two or more entries;
the prediction circuitry is configured to select a respective prediction register entry for the given branch instruction.

8. The circuitry of claim 7, in which each prediction register entry comprises a plurality of prediction data values, and the prediction circuitry is configured to select one of the prediction data values for use as the prediction data for the given branch instruction according to a permutation of most recent resolutions of whether the branch represented by the given branch instruction is taken or not.

9. A method comprising:
storing within a prediction register a plurality of entries each having respective data values for association with one or more branch instructions;
detecting, using prediction data derived by a mapping function from the stored data value associated with a given branch instruction that is obtained from the prediction register, whether or not a branch represented by the given branch instruction is predicted to be taken;
modifying the data value associated with the given branch instruction as stored in an entry of the prediction register in dependence upon a resolution of whether the branch represented by the given branch instruction is taken or not; and in addition, selectively modifying the stored data values of a set of one or more additional entries of the prediction register other than the entry storing the data value associated with the given branch instruction.

\* \* \* \* \*